US009602697B2

(12) United States Patent
Maloney et al.

(10) Patent No.: US 9,602,697 B2
(45) Date of Patent: Mar. 21, 2017

(54) COLOR SUBSTITUTION MECHANISM

(75) Inventors: Israel Kee Maloney, Boulder, CO (US); John Thomas Varga, Longmont, CO (US); Timothy LeRoy Towns, Longmont, CO (US); Justin James Coulter, Longmont, CO (US); Miki Judy Ushijima, Longmont, CO (US); John Forrest Meixel, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 1693 days.

(21) Appl. No.: 12/870,500

(22) Filed: Aug. 27, 2010

(65) Prior Publication Data

US 2012/0050756 A1 Mar. 1, 2012

(51) Int. Cl.
*H04N 1/00* (2006.01)
*H04N 1/60* (2006.01)

(52) U.S. Cl.
CPC .......... *H04N 1/603* (2013.01); *H04N 1/0009* (2013.01); *H04N 1/00015* (2013.01); *H04N 1/00023* (2013.01); *H04N 1/00031* (2013.01); *H04N 1/00045* (2013.01); *H04N 1/00053* (2013.01); *H04N 1/00063* (2013.01)

(58) Field of Classification Search
None
See application file for complete search history.

(56) References Cited

U.S. PATENT DOCUMENTS 5,054,097 A * 10/1991 Flinois et al. ................ 382/294
5,982,995 A * 11/1999 Covert et al. ................ 358/1.15
6,532,016 B1 * 3/2003 Venkateswar et al. ....... 345/504
6,633,666 B2 10/2003 Gill et al.
7,227,666 B1 6/2007 MacLeod
(Continued)

FOREIGN PATENT DOCUMENTS

DE  10 2006 002886  7/2007
EP  1 033 645  9/2000
(Continued)

OTHER PUBLICATIONS

Dianat, Sohail, et al., "Dynamic Optimization Algorithm for Generating Inverse Printer Map with Reduced Measurements", 1-4244-0469-X/06, 1172-1175.
(Continued)

*Primary Examiner* — Paul F Payer
(74) *Attorney, Agent, or Firm* — Blakely, Sokoloff, Taylor & Zafman LLP

(57) ABSTRACT

A method is disclosed. The method includes receiving a request to perform color conversion during rasterization of a print job object at a printer, determining if a substitution mapping file is available for an output color space to be generated by the color conversion, determining if the substitution mapping file includes a substitution entry for the input color space color value to the output color space in use, generating the output color by using the substitution mapping file to map an input color from an input color space to an output color space if the substitution entry is available and generating the output color by using a color management system to map the input color from the input color space to the output color space if the substitution entry is not available.

28 Claims, 4 Drawing Sheets

(56) References Cited

U.S. PATENT DOCUMENTS

| | | | |
|---|---|---|---|
| 7,271,935 B2 | 9/2007 | Coons et al. | |
| 7,486,415 B2 * | 2/2009 | Kwak | |
| 7,616,346 B2 * | 11/2009 | Stevens | 358/3.01 |
| 7,652,791 B2 | 1/2010 | McCarthy et al. | |
| 7,738,140 B2 * | 6/2010 | Hancock et al. | 358/1.9 |
| 7,760,397 B2 | 7/2010 | Hosier | |
| 7,933,053 B2 * | 4/2011 | Dalal et al. | 358/518 |
| 2002/0111963 A1 | 8/2002 | Gebert et al. | |
| 2002/0118380 A1 | 8/2002 | Krueger | |
| 2005/0002051 A1 | 1/2005 | Kurumida et al. | |
| 2005/0024661 A1 * | 2/2005 | Akashi | 358/1.9 |
| 2005/0052668 A1 | 3/2005 | Hoshino | |
| 2006/0092463 A1 | 5/2006 | Ahn | |
| 2006/0098233 A1 | 5/2006 | Jodra et al. | |
| 2007/0139671 A1 | 6/2007 | Stevens | |
| 2007/0146742 A1 | 6/2007 | Klassen | |
| 2009/0290180 A1 | 11/2009 | Onoda | |

FOREIGN PATENT DOCUMENTS

| | | |
|---|---|---|
| GB | 2 368 436 | 5/2002 |
| JP | 2000203094 | 7/2000 |
| JP | 2006086969 | 3/2006 |

OTHER PUBLICATIONS

Jang, et al., "Hi-Fi Printer Characterization Method Using Color Correlation for Gamut Extension", 1-4244-0481-9/06, 1517-1520.
"PCT Search Report and Written Opinion", PCT/US2011/044898, (Nov. 25, 2011), 11 pages.
EP Search Report, EP11820324, Oct. 15, 2004, 7 pages.

* cited by examiner

COLOR SUBSTITUTION MECHANISM

FIELD OF THE INVENTION

This invention relates generally to the field of printing systems. More particularly, the invention relates to substituting output profile colors in a printing system.

BACKGROUND

Growth in color management has resulted in an increase in software packages that are used to generate International Color Consortium (ICC) profiles. ICC profiles describe color attributes of a particular device or viewing requirement by defining a mapping between a source or target color space and a Profile Connection Space (PCS), such as either CIELAB (L*a*b*) or CIEXYZ.

However, print customers often request that one or more colors specified in a print job accurately match desired colors. While some colors in a print job are not needed, or may be reproduced within some tolerance range, other colors are essential and require accurate color reproduction. For example, a customer may request a set of colors printed with an old printer of a different vendor be accurately matched by a new color printer. An acceptable match to such colors may not be available at the printer at which a job is being performed.

Therefore, mechanism to accurately match colors is desired.

SUMMARY

In one embodiment, a method is disclosed. The method includes receiving a request to perform color conversion during rasterization of a print job object at a printer, determining if a substitution mapping file is available for an output color space to be generated by the color conversion, determining if the substitution mapping file includes a substitution entry for the input color space color value to the output color space in use, generating the output color by using the substitution mapping file to map an input color from an input color space to an output color space if the substitution mapping file is available and generating the output color by using a color management system to map the input color from the input color space to the output color space if the substitution mapping file is not available.

In another embodiment, a printer is disclosed. The printer includes one or more substitution profiles; and a rasterizer to include a color management module to process received image objects. The rasterizer generates an output color by using a substitution mapping file to map an input color from an input color space to an output color space if the substitution mapping file is available and generates the output color by using a color management system to map the input color from the input color space to the output color space if the substitution mapping file is not available.

BRIEF DESCRIPTION OF THE DRAWINGS

A better understanding of the present invention can be obtained from the following detailed description in conjunction with the following drawings, in which.

DETAILED DESCRIPTION

A color substitution mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
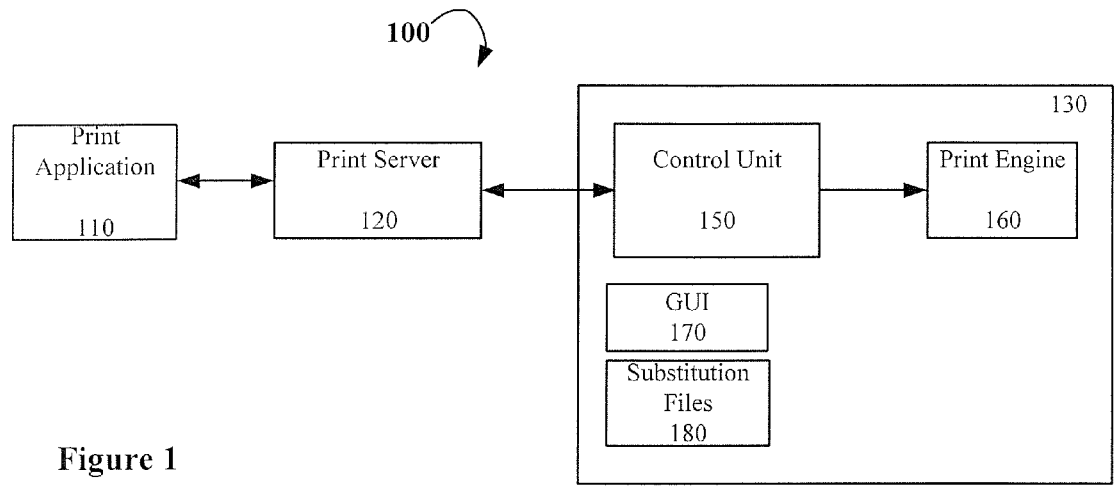
FIG. 1 illustrates one embodiment of a printing system.

FIG. 1 illustrates one embodiment of a printing system 100. Printing system 100 includes a print application 110, a server 120 and printer 130. Print application 110 makes a request for the printing of a document. In one embodiment, print application 110 provides Advanced function printing (AFP) files for printing to print server 120. In a further embodiment, the print application provides a Mixed Object Document Content Architecture (MO:DCA) data stream to print server 108.

According to one embodiment, the AFP MO:DCA data streams are object-oriented streams including, among other things, data objects, page objects, and resource objects. Although described with reference to AFP data streams, other embodiments may implement, PostScript (PS) and Portable Document Format (PDF) data streams.

Printer 130 includes a control unit 150 and a print engine 160. According to one embodiment, control unit 150 performs processing functions for printer 130. In a further embodiment, control unit 150 processes and renders objects received from print server 120 and provides sheet maps for printing to print engine 160. Moreover, control unit 150 may include processing logic that may include hardware (e.g., circuitry, dedicated logic, programmable logic, microcode, etc.), software (such as instructions run on a processing device), or a combination thereof.

Figure 2:
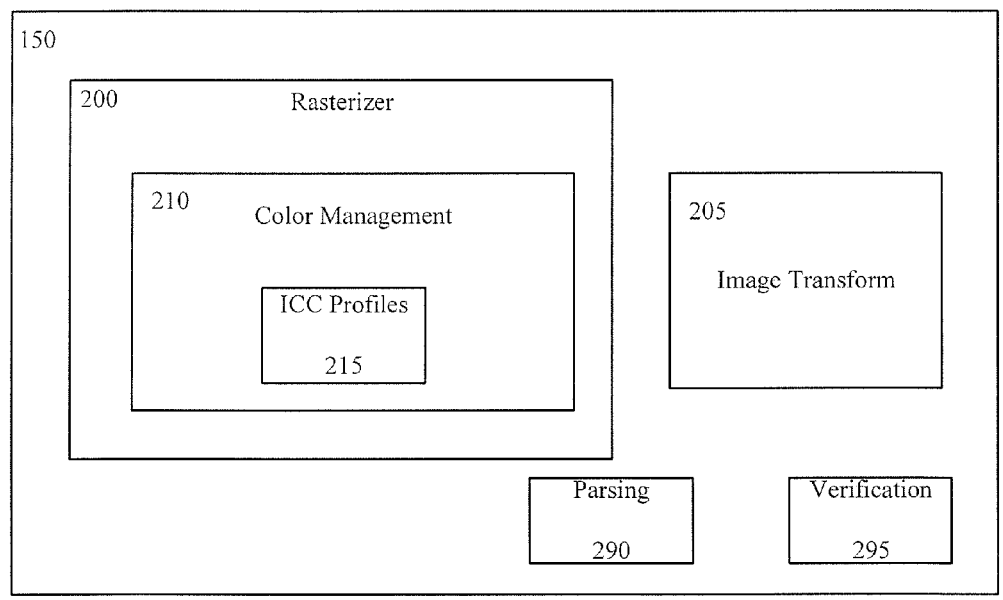
FIG. 2 illustrates one embodiment of a control unit.

FIG. 2 illustrates one embodiment of a control unit 150. Control unit 150 includes a rasterizer 200 and image transform 205. Rasterizer 200 is implemented to process image objects received at control unit 150 by performing a raster image process (RIP) to convert an image described in a vector graphics format (e.g., shapes) into a raster image (e.g., pixels) for output to print engine 160.

Rasterizer 200 includes a color management unit 210 that provides a color mapping from a source to a destination color space. In one embodiment, color management unit 210 uses ICC profiles 215 to perform the mapping to determine CMYK values for each pixel in a particular object to be printed at print engine 160. However in another embodiment, other color management schemes may be implemented. An image transform 205 is also included to perform rasterization on image objects.

As discussed above, printer 130 may not be capable of providing an accurate color mapping for one or more objects within a print job. Thus in one embodiment, output color profiles may be installed at printer 130. In such an embodiment, a text file (or substitution mapping file) 180 is loaded into printer 130 to provide color substitutions specified in the device color space (e.g., Cyan, Magenta, Yellow, Black (CMYK)). The substitution mapping file includes substitution mappings from input colors and color spaces to output colors and color spaces that are used to generate a substitute profile that overrides the CMYK colors in a similarly-named output profile. The substitution mappings may be controlled by input color space and are applied when using a targeted output profile.

Upon loading of a substitution mapping file 180 into printer 130, an operator may select a corresponding ICC profile, using a Graphical User Interface (GUI) 170, as a replacement for critical input colors and color spaces in order to achieve the most desired color match on printed output. According to one embodiment, a print job is inspected to determine selected colors and color spaces. In such an embodiment, the selected colors and color spaces are determined using a color adjustment tool, such as the InfoPrint Color Adjustment Tool (ICAT).

Subsequently, a series of color patches near a desired color is printed using the device color space. The patch that is the closest match to the desired color is selected and the color space (e.g., CMYK) values are acquired using the color adjustment tool. In one embodiment, these values are used to generate (manually or using the tool) the substitute text file listing the substitutions that are to be made. In such an embodiment, the file is named by copying the original profile name, and replacing the file type with "ics" (for "ICC Substitutions"). For instance a profile named "DeepRed" would be replaced with "DeepRed.ics". The file is then saved to a storage device (e.g., a Universal Serial Bus (USB) flash) for later transportation to the printer.

According to one embodiment, a substitution file includes a set of plain text lines each having various fields. One field includes a keyword for the selected input space to match (e.g., RGB, Swap CMYK, Euro CMYK, device CMYK, CIELab, grayscale value, OCA, highlight, etc.). In one embodiment, the keywords are case insensitive (e.g., cmyk, gray, oca, hilite, and rgb). Another field includes a series of values separated by spaces or commas defining the color values in the selected input space depending on the number of values the input space needs to specify the color. In a further embodiment, a colon is used to delimit the identified color from the substituted output color.

Yet another field includes values defining a desired gray shade or CMYK color in device K or CMYK (e.g., using a range of 0 to 255 for the values). The values may be separated by spaces or commas. The appropriate substitution line will be used depending on the output type for the side (e.g., CMYK or grayscale).

In another embodiment, a line may also include comment information, starting with various predefined keywords, to keep definitions, versions, user text, comments, format delimiters, etc. These comments may then be used at printer 130 to populate descriptive areas when displaying the files on at GUI 170.

After generation, a substitution mapping file is loaded from the storage device to printer 130 in order to generate a substitute object. In one embodiment, the substitution mapping file are listed, read and stored in a unique directory and may be deleted and reloaded. In one embodiment, a monitored value is changed when profiles are modified or added in order to alert users. Further, the substitution files may not be specific to CMYK or K only, since both can be on the same profile, and do not need to be separated by output type.

Figure 3:
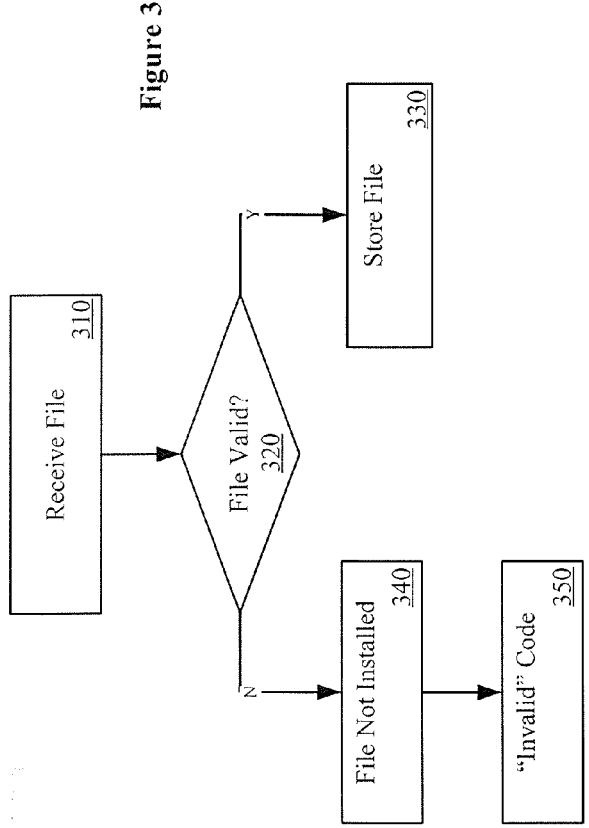
FIG. 3 is a flow diagram illustrating one embodiment of installing a substitution mapping file.

FIG. 3 is a flow diagram illustrating one embodiment of a process occurring at printer 130 upon installation of a substitution mapping file. At processing block 310, the file is received at printer 130 upon downloading from a storage device. At decision block 320, a determination is made as to whether the substitution mapping file is valid. According to one embodiment, printer 130 includes a parsing module 290 and verification module 295 to assure the file is usable and without error.

In such an embodiment, each recognized color space is verified for a number of values for input and output. Further, errors are generated for too many values, too few values and out of range values (e.g., 0 to 255 numeric). Errors are also generated for parsing errors. Unsupported color spaces are not permitted to make sure an operator does not believe such a function is available.

If the file is valid it is stored in the above described directory, processing block 330. If the file is determined to be invalid, the file is not installed rather than being installed, processing block 340. At processing block 350, an "invalid" code is displayed at GUI 170.

Figure 4:
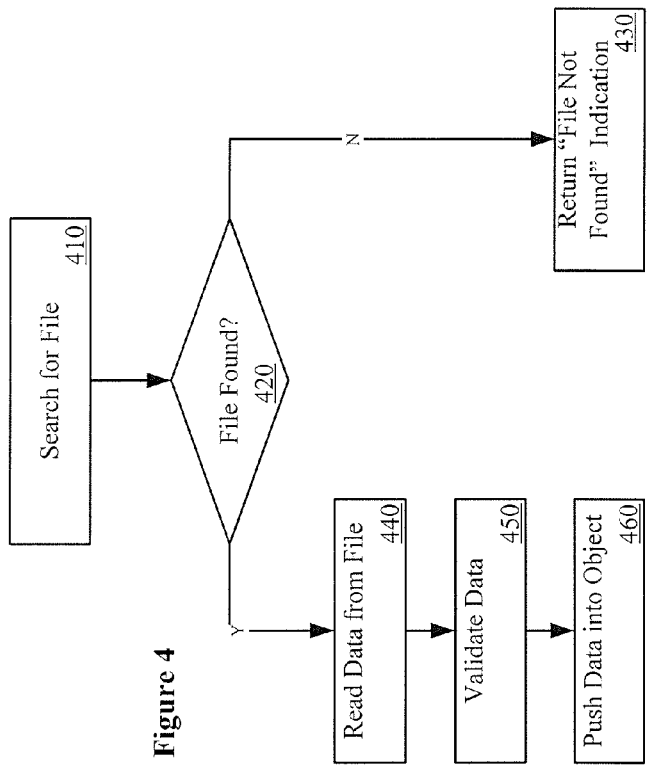
FIG. 4 is a flow diagram illustrating one embodiment of initiating a substitution mapping file.

FIG. 4 is a flow diagram illustrating one embodiment of initiating a substitution mapping file upon activation of printer 130. In one embodiment, such a process occurs upon startup of printer 130 or upon the changing of an instruction (output) profile. At processing block 410, a search for a substitution mapping file is performed by parser module 290. At decision block 420, it is determined whether the file has been found. If the file has not been found, parser module 190 will return a code indicating the file has not been found, processing block 430. If the file is found data is read from the file, processing block 440. At processing block 450, the data is validated by parser module 190. At processing block 460, the data is pushed into an ICS object based on the input color space and the output color space. Each ICS object will be filled with a list of substitutions for a particular input and output color space combination in the substitution mapping file.

Figure 5:
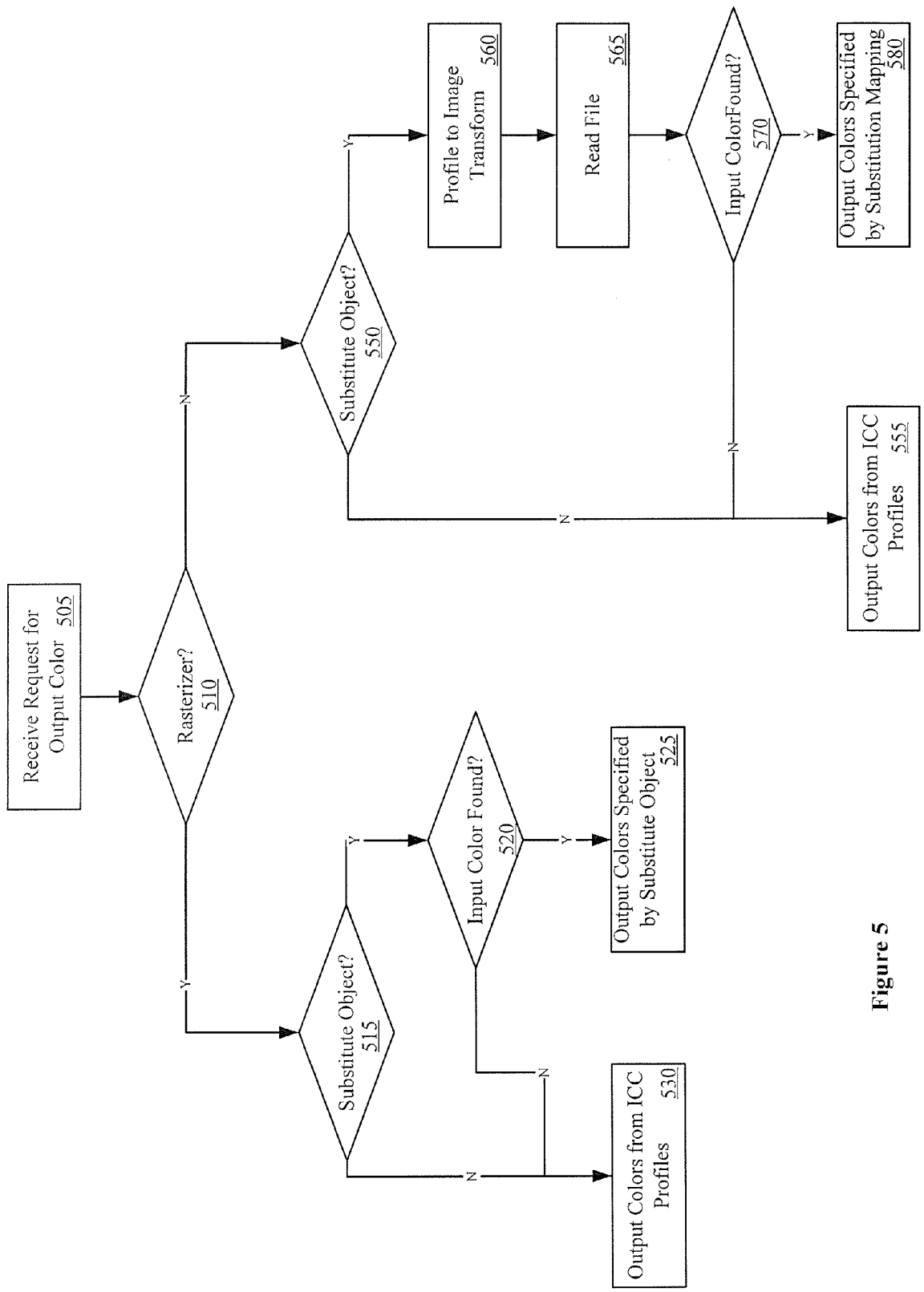
FIG. 5 is a flow diagram illustrating one embodiment of rasterizing an object.

Once ICS objects are created, substitutions are available during rasterization. FIG. 5 is a flow diagram illustrating one embodiment of using a substitution mapping object for color substitution during rasterization. At processing block 505, a request is received to perform conversion of a color from an input color space to an output color space. At decision block 510, it is determined whether rasterization is to occur at rasterizer 200 or image transform 205.

In one embodiment, text, barcode, goca, fs10 and fs11 objects within a print job data stream are rasterized at rasterizer 200, while various image objects are processed at image transform 205. If an object is to be processed at rasterizer 200, it is determined whether a substitution mapping object exists corresponding to the current input color space and the targeted output profile for the color conversion, decision block 515.

According to one embodiment, rasterizer 200 requests a lookup table (LUT) and instruction filename that was used to create that LUT. Subsequently, the instruction filename, input color, input color space, and output color space are passed to rasterizer 200. The instruction filename and color spaces are used as a key to search for a substitution mapping object having that key.

If a substitution mapping object is available, it is determined whether an input color has been found in the selected substitution mapping object corresponding to the passed input color, decision block 520. If so, the substituted color is returned and used for the color conversion, processing block 525. However, if a substitution mapping object does not exist or the input color is not found in the substitute object's list, an output color from ICC profiles 215 is used for color conversion, processing block 530.

If at decision block 510 it is determined that rasterization is to occur at image transform 205, it is determined whether a substitution mapping file exists corresponding to the targeted output profile for the color conversion, decision block 550. According to one embodiment, image transform 205 requests the LUT filename and instruction filename that was used to create that LUT. The instruction filename is again used as a key to search for a substitution mapping file object having that key.

If a substitution mapping file is not found, an output color from ICC profiles 215 is used for color conversion, processing block 555. Otherwise, the substitute file is provided to image transform 205, processing block 560. At processing block 565, the substitution file is read by image transform 205. At decision block 570, it is determined whether an input color has been found in the selected substitution mapping object corresponding to the passed input color. If the input color is not found in the substitution mapping object's list, control is returned to processing block 555 where an output color from ICC profiles 215 is used for color conversion. If the input color is found, the output color specified in the substitution file is used for the color conversion, processing block 580.

Figure 6:
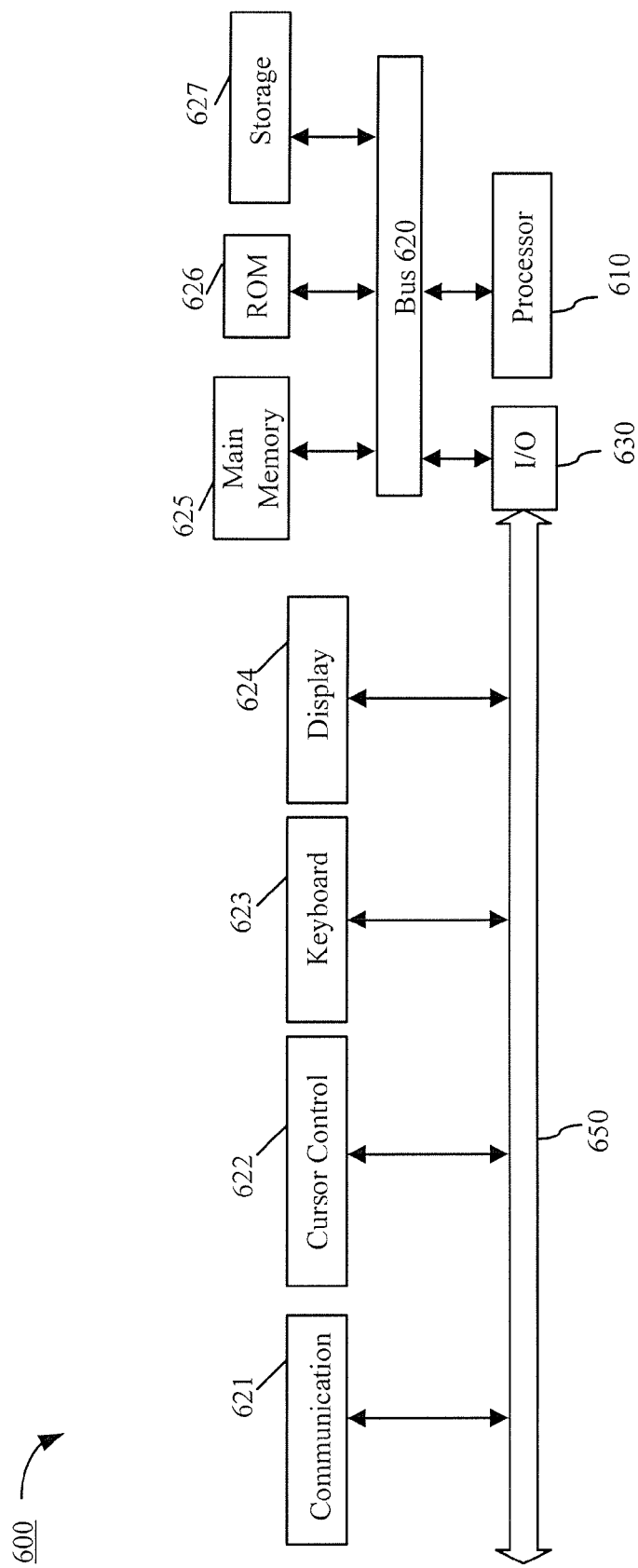
FIG. 6 illustrates one embodiment of a computer system.

FIG. 6 illustrates a computer system 600 on which print server 120 and printer 130 described with respect to FIG. 1 may be implemented. Computer system 600 includes a system bus 620 for communicating information, and a processor 610 coupled to bus 620 for processing information. According to one embodiment, processor 610 is implemented using one of the multitudes of ARM™ microprocessors. Nevertheless one of ordinary skill in the art will appreciate that other processors may be used.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 400 also may include a read only memory (ROM) and or other static storage device 626 coupled to bus 620 for storing static information and instructions used by processor 610.

A data storage device 625 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624, an input device (e.g., an alphanumeric input device 623 and or a cursor control device 622). The communication device 621 is for accessing other computers (servers or clients) via an external data network, for example. The communication device 621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method comprising:
   receiving a request to perform color conversion during rasterization of a print job object at a printer;
   determining if a substitution mapping file is available for an output color space to be generated by the color conversion;
   determining if the substitution mapping file includes a substitution entry for an input color space color value to the output color space in use;
   generating an output color by using the substitution mapping file to map an input color from an input color space to an output color space if the substitution entry is available; and
   generating the output color by using a color management system to map the input color from the input color space to the output color space if the substitution entry is not available.

2. The method of claim 1, further comprising finding an input color in the substitution mapping file corresponding to the input color if the object is to be rasterized at a rasterizer.

3. The method of claim 2, further comprising generating the output color using the color management system if the input color cannot be found in the substitution mapping file.

4. The method of claim 2, further comprising generating the output color using the input color found in the substitution mapping file.

5. The method of claim 1, further comprising providing the substitution mapping file to an image transform if the object is to be rasterized at the image transform.

6. The method of claim 5, further comprising:
   the image transform reading the substitution mapping file; and
   generating the output color specified in the substitution mapping file.

7. The method of claim 5, further comprising generating the output color using the color management system if the input color cannot be found in the substitution mapping file.

8. The method of claim 5, further comprising generating the output color by using the substitution mapping file if the input color is found in the substitution mapping file.

9. The method of claim 1, wherein the substitution mapping file is generated from a text file.

10. The method of claim 9, further comprising loading the text file into the printer.

11. The method of claim 10, wherein loading the text file into the printer comprises:
   determining if the text file is valid; and
   storing the text file in a directory if the text file is valid.

12. The method of claim 11, further comprising rejecting the text file if the text file is invalid.

13. The method of claim 10, further comprising initiating the text file at the printer.

14. The method of claim 13, wherein the text file is initiated upon start up of the printer.

15. The method of claim 13, wherein the text file is initiated upon changing an instruction or output profile.

16. The method of claim 13, wherein initiating the text file comprises:
   searching for the text file;
   reading the text file; and
   generating substitution objects for every combination of input color space to output color space mapping in the text file.

17. A printer, comprising:
   one or more substitution mapping files; and
   a rasterizer including a color management module to process received image objects, the rasterizer to generate an output color by using a substitution mapping file to map an input color from an input color space to an output color space if a corresponding substitution entry in the substitution mapping file is available and generate the output color by using a color management system to map the input color from the input color space to the output color space if the substitution entry is not available; and
   an image transform to generate the output color using the substitution mapping file if the substitution entry corresponding to the input color is available and generate the output color using the color management system if the substitution entry corresponding to the input color is not available.

18. The printer of claim 17, wherein the rasterizer generates the output color by using the color management system if the input color cannot be found in the substitution mapping file.

19. The printer of claim 18, wherein the rasterizer generates the output color by using the substitution mapping file if the input color is found in the substitution mapping file.

20. The printer of claim 17, wherein the substitution mapping file is generated from a text file loaded into the printer.

21. The printer of claim 20, wherein the printer comprises a control unit to determine if the text file is valid upon loading and stores the text file in a directory if the text file is valid.

22. The printer of claim 21, wherein the control unit rejects the text file if the text file is invalid.

23. The printer of claim 21, wherein the control unit initiates the text file at the printer by searching for the text file, reading the text file and generating substitution objects.

24. An article of manufacture comprising a non-transitory machine-readable medium including data that, when accessed by a machine, cause the machine to perform operations comprising:
   determining if an object is to be rasterized at a rasterizer or an image transform;
   receiving a request to perform color conversion during rasterization of a print job object at a printer;
   determining if a substitution mapping file is available for an output color space to be generated by the color conversion;
   determining if the substitution mapping file includes a substitution entry for an input color space color value to the output color space in use;
   generating an output color by using the substitution mapping file to map an input color from an input color space to an output color space if the substitution entry is available; and
   generating the output color by using a color management system to map the input color from the input color space to the output color space if the substitution entry is not available.

25. The article of manufacture of claim 24, wherein the non-transitory machine-accessible medium includes data that causes the machine to perform further operations comprising:
   finding an output color in the substitution mapping file corresponding to the input color if the object is to be rasterized at the rasterizer; and
   generating the output color using the color management system if the input color cannot be found in the substitution mapping file.

26. The article of manufacture of claim 25, wherein the non-transitory machine-accessible medium includes data that causes the machine to perform further operations comprising generating the output color using the output color found in the substitution mapping file.

27. The article of manufacture of claim 24, wherein the non-transitory machine-accessible medium includes data that causes the machine to perform further operations comprising providing the substitution mapping file to the image transform if the object is to be rasterized at the image transform.

28. The article of manufacture of claim 27, wherein the non-transitory machine-accessible medium includes data that causes the machine to perform further operations comprising:
   the image transform reading the substitution mapping file; and
   generating the output color specified in the substitution mapping file.

* * * * *